(12) United States Patent
Shiiyama et al.

(10) Patent No.: US 10,870,366 B2
(45) Date of Patent: Dec. 22, 2020

(54) SYSTEM AND COMPUTER READABLE STORAGE MEDIUM FOR A BATTERY EXCHANGER

(71) Applicant: HONDA MOTOR CO., LTD., Tokyo (JP)

(72) Inventors: Takumi Shiiyama, Saitama (JP); Ryo Oshima, Saitama (JP); Ryuichi Kimata, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/558,147

(22) Filed: Sep. 1, 2019

(65) Prior Publication Data

US 2019/0381911 A1   Dec. 19, 2019

Related U.S. Application Data

(63) Continuation of application No. PCT/JP2018/010910, filed on Mar. 19, 2018.

(30) Foreign Application Priority Data

Mar. 24, 2017   (JP) ................................. 2017-058597

(51) Int. Cl.
*H02J 7/00* (2006.01)
*B60L 53/80* (2019.01)
(Continued)

(52) U.S. Cl.
CPC .............. *B60L 53/80* (2019.02); *B60L 53/65* (2019.02); *B60L 53/665* (2019.02); *B60L 58/16* (2019.02)

(58) Field of Classification Search
CPC ....................................................... B60L 53/80
(Continued)

(56) References Cited

U.S. PATENT DOCUMENTS 6,940,254 B2 * 9/2005 Nagamine .............. G06Q 30/06
                                                                320/109
9,123,035 B2 * 9/2015 Penilla .................... G06Q 20/18
(Continued)

FOREIGN PATENT DOCUMENTS

JP       2001057711 A      2/2001
JP       2010191636 A      9/2010
(Continued)

OTHER PUBLICATIONS

International Search Report and (ISA/237) Written Opinion of the International Search Authority for International Patent Application No. PCT/JP2018/010910, mailed by the Japan Patent Office dated May 15, 2018.
(Continued)

*Primary Examiner* — Yalkew Fantu

(57) ABSTRACT

The system is a system for a battery exchanger that accepts a used first battery and provides a charged second battery. The above system includes a support target information receiving unit that receives, from a supporter that supports operation of a battery exchanger, an instruction for selecting the battery exchanger for which the supporter supports operation from among multiple battery exchangers. The above system includes a user information providing unit that provides the supporter with information on the user of the battery exchanger selected by the supporter, according to support value information indicating the value of the support for the operation of the battery exchanger by the supporter.

11 Claims, 9 Drawing Sheets

(51) Int. Cl.
  *B60L 53/65* (2019.01)
  *B60L 58/16* (2019.01)
  *B60L 53/66* (2019.01)

(58) Field of Classification Search
  USPC .......................................................... 320/107
  See application file for complete search history.

(56) References Cited

U.S. PATENT DOCUMENTS

| | | | |
|---|---|---|---|
| 9,288,270 B1* | 3/2016 | Penilla | H04L 67/306 |
| 10,055,911 B2 | 8/2018 | Luke | |
| 10,065,525 B2 | 9/2018 | Chen | |
| 10,158,102 B2 | 12/2018 | Wu | |
| 10,186,094 B2 | 1/2019 | Wu | |
| 10,209,090 B2 | 2/2019 | Luke | |
| 10,345,843 B2 | 7/2019 | Luke | |
| 2012/0136705 A1 | 5/2012 | Enmei | |
| 2012/0249068 A1 | 10/2012 | Ishida | |
| 2012/0271723 A1* | 10/2012 | Penilla | G01C 21/3407 |
| | | | 705/16 |
| 2013/0026971 A1 | 1/2013 | Luke | |
| 2013/0030580 A1 | 1/2013 | Luke | |
| 2013/0030581 A1 | 1/2013 | Luke | |
| 2013/0030608 A1 | 1/2013 | Taylor | |
| 2013/0030630 A1 | 1/2013 | Luke | |
| 2013/0030920 A1 | 1/2013 | Wu | |
| 2013/0033203 A1 | 2/2013 | Luke | |
| 2013/0116892 A1 | 5/2013 | Wu | |
| 2013/0179057 A1* | 7/2013 | Fisher | B60L 53/68 |
| | | | 701/117 |
| 2014/0142786 A1 | 5/2014 | Huang | |
| 2014/0200742 A1* | 7/2014 | Mauti, Jr. | F02D 29/02 |
| | | | 701/2 |
| 2014/0203077 A1* | 7/2014 | Gadh | H02J 7/00 |
| | | | 235/382 |
| 2014/0251710 A1 | 9/2014 | Juan | |
| 2014/0253021 A1 | 9/2014 | Luke | |
| 2014/0266006 A1 | 9/2014 | Luke | |
| 2014/0277844 A1 | 9/2014 | Luke | |
| 2014/0279576 A1 | 9/2014 | Luke | |
| 2015/0042157 A1 | 2/2015 | Chen | |
| 2016/0264011 A1 | 9/2016 | Yasukawa | |

FOREIGN PATENT DOCUMENTS

| | | |
|---|---|---|
| JP | 2010200551 A | 9/2010 |
| JP | 2011078229 A | 4/2011 |
| JP | 2012048286 A | 3/2012 |
| JP | 2013041324 A | 2/2013 |
| JP | 2014525229 A | 9/2014 |
| JP | 2014525230 A | 9/2014 |
| JP | 2014525231 A | 9/2014 |
| JP | 2014527390 A | 10/2014 |
| JP | 2014527689 A | 10/2014 |
| JP | 2014529117 A | 10/2014 |
| JP | 2014529118 A | 10/2014 |
| JP | 2014529119 A | 10/2014 |
| JP | 2014529392 A | 11/2014 |
| JP | 2014529982 A | 11/2014 |
| JP | 2014531699 A | 11/2014 |
| JP | 2014533480 A | 12/2014 |
| JP | 2015502881 A | 1/2015 |
| JP | 2015231837 A | 12/2015 |
| JP | 2015534927 A | 12/2015 |
| JP | 2016514357 A | 5/2016 |
| JP | 2016515063 A | 5/2016 |
| JP | 2016517257 A | 6/2016 |
| JP | 2016521389 A | 7/2016 |
| JP | 2016521393 A | 7/2016 |
| JP | 2016527871 A | 9/2016 |
| JP | 2016533154 A | 10/2016 |
| JP | 2016534518 A | 11/2016 |
| WO | 2010035605 A1 | 4/2010 |
| WO | 2011077780 A1 | 6/2011 |
| WO | 2011115182 A1 | 9/2011 |
| WO | 2012173134 A1 | 12/2012 |
| WO | 2015053163 A1 | 4/2015 |

OTHER PUBLICATIONS

Decision to Grant a Patent issued for counterpart Japanese Application No. 2017-058597, drafted by the Japan Patent Office dated Feb. 15, 2018.

\* cited by examiner

| USER ID | BATTERY EXCHANGER ID | ACCEPTED BATTERY ID → PROVIDED BATTERY ID | TIME INFORMATION | POSITION HISTORY INFORMATION |
|---|---|---|---|---|
| U1 | ST1 | B1→B2 | 2017-03-01 15:30:22 | LATITUDE LONGITUDE 1<br>LATITUDE LONGITUDE 2<br>... |
| U2 | ST2 | B2→B3 | 2017-03-05 16:08:20 | LATITUDE LONGITUDE 4<br>LATITUDE LONGITUDE 5<br>... |
| U3 | ST3 | B3→B4 | 2017-03-09 18:20:40 | LATITUDE LONGITUDE 7<br>LATITUDE LONGITUDE 8<br>... |
| ... | ... | ... | ... | ... |

*FIG. 4*

```
┌─────────────────────────────────────────┐
│                                      ─900│
│   XX CLINIC BATTERY STATION              │
│                                          │
│        USER INFORMATION                  │
│                           ─910           │
│   AVERAGE TRAVEL DISTANCE                │
│   FROM PREVIOUS BATTERY                  │
│   REPLACEMENT              21.5km        │
│                                          │
│   AVERAGE TRAVEL DISTANCE ─920           │
│   AFTER BATTERY REPLACEMENT 15.2km       │
│                           ─930           │
│            REPEAT RATE 80%               │
│                                          │
└─────────────────────────────────────────┘

FIG. 9
```

SYSTEM AND COMPUTER READABLE STORAGE MEDIUM FOR A BATTERY EXCHANGER

CROSS REFERENCE TO RELATED APPLICATION

The contents of the following Japanese patent application and international application are incorporated herein by reference:

Japanese Application No. 2017-058597 filed on Mar. 24, 2017, and

International Application No. PCT/JP2018/010910 filed on Mar. 19, 2018.

BACKGROUND

1. Technical Field

The present invention relates to a system and a computer readable storage medium.

2. Related Art

An energy supply station having a function of storing a group of fully charged batteries has been known (see Patent Literature 1).

Patent Literature 1: Japanese Patent Application Publication No. 2001-57711

BRIEF DESCRIPTION OF THE DRAWINGS

FIG. 4 shows one example of information stored in a history storage unit 132 in a table format.

FIG. 9 shows one example of a screen 900 displayed on the supporter terminal 40.

DESCRIPTION OF EXEMPLARY EMBODIMENTS

Figure 1:
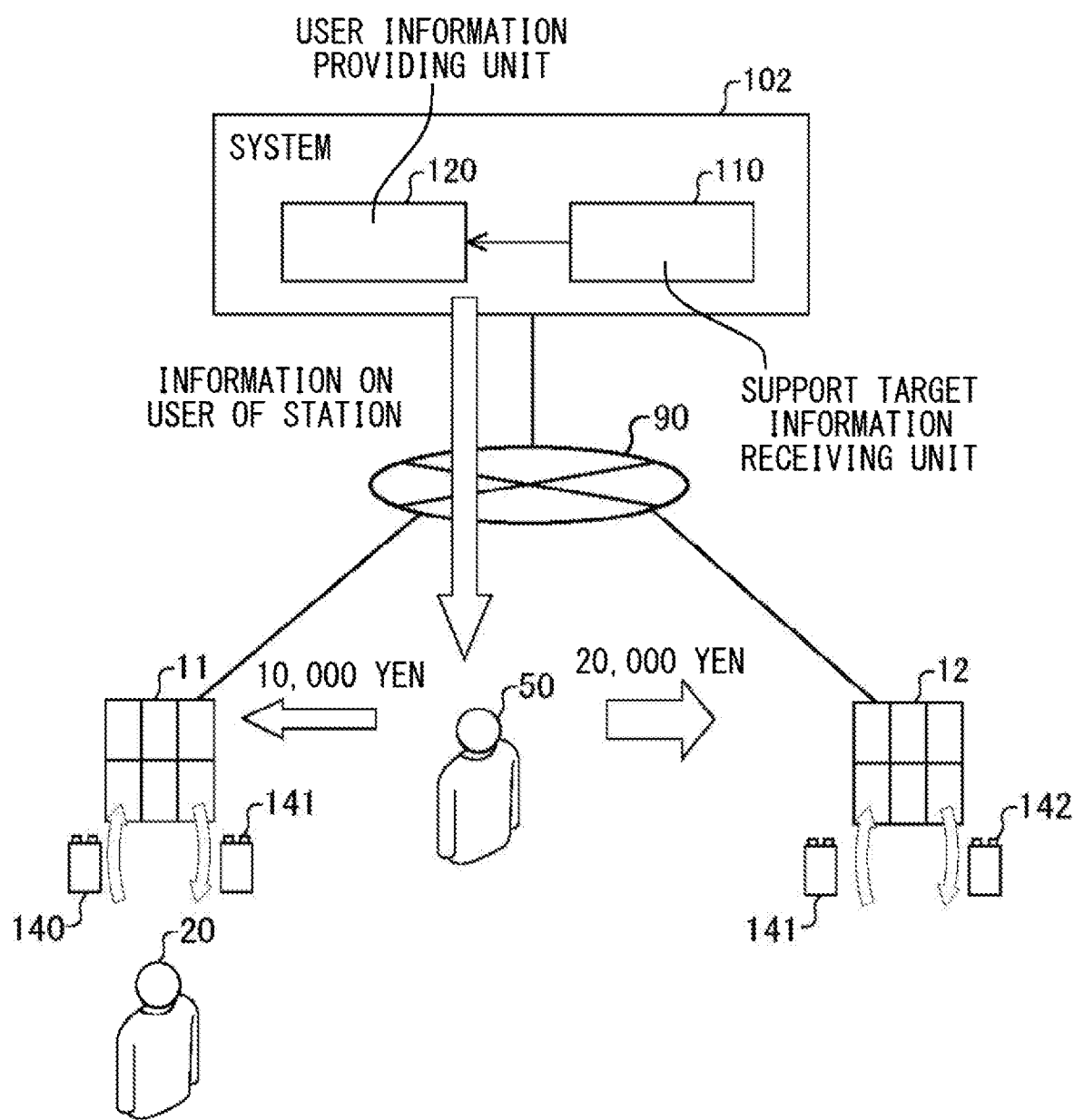
FIG. 1 schematically shows a basic configuration of an operation system 100.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Note that in the drawings, the same or similar parts may be denoted by the same reference numerals and redundant description may be omitted.

FIG. 1 schematically shows a basic configuration of an operation system 100. In FIG. 1, the operation system 100 includes a system 102, a communication network 90, a battery exchanger 11, a battery exchanger 12, a battery 140, a battery 141, and a battery 142.

The system 102 includes a support target information receiving unit 110 and a user information providing unit 120. The system 102 is provided by a server, for example. The battery 140, the battery 141, and the battery 142 are secondary batteries such as a lithium ion battery, a nickel hydrogen battery, and a lead storage battery.

The battery exchanger 11 accepts the used battery 140 and provides the charged battery 141. For example, the battery 140 is provided by a user 20, and the battery 141 is provided to the user 20.

After providing the battery 141 to the user 20, the battery exchanger 11 requests the system 102 to bill the user 20. The user 20 uses the charged battery 141 provided from the battery exchanger 11. For example, the user 20 uses the battery 141 for powering a vehicle such as an electric motorcycle. The battery exchanger 11 charges the battery 140 accepted from the user 20. When charging of the battery 140 is completed, the battery 140 can be provided to another user.

In the operation system 100, the battery 141 used by the user 20 can be replaced by using the battery exchanger 12. The battery exchanger 12 accepts the used battery 141 and provides the charged battery 142 to the user 20. For example, the battery 141 is provided by the user 20, and the battery 142 is provided to the user 20.

A supporter 50 supports operation of at least one of the battery exchanger 11 and the battery exchanger 12. For example, the supporter 50 provides the operator of the battery exchanger 11 or the operator of the operation system 100 with a support fund for supporting operation of the battery exchanger 11. As compensation for supporting the operation, the system 102 provides the supporter 50 with information on the user of the supported one of the battery exchanger 11 and the battery exchanger 12.

The system 102 provides a system that can facilitate operational support of the battery exchanger. The support target information receiving unit 110 receives, from the supporter 50, an instruction for selecting the battery exchanger for which the supporter 50 supports operation from among a plurality of battery exchangers. The user information providing unit 120 provides the supporter 50 with information on the user of the battery exchanger selected by the supporter 50, according to support value information indicating the value of the support for the operation of the battery exchanger by the supporter 50.

For example, if the amount of support fund paid by the supporter 50 to support operation of the battery exchanger 11 is 10,000 yen, the number of users per day of the battery exchanger 11 is provided, but the repeat rate of the battery exchanger 11 is not provided. Meanwhile, the supporter 50 pays a support fund of 20,000 yen to support operation of the battery exchanger 12. In this case, not only the number of users per day of the battery exchanger 12 but also the repeat rate of the battery exchanger 12 is provided to the supporter 50.

According to the operation system 100, the supporter 50 can grasp the operation status of the battery exchanger 11 and the battery exchanger 12. For example, in a case where the supporter 50 runs a store near the battery exchanger 12, it is possible to determine the assortment of the store on the basis of the information on the users of the battery exchanger 12. For example, if it turns out that a large portion of the users of the battery exchanger 12 is men in their thirties, it may be possible to increase store sales by increasing the number of products for men in their thirties.

Figure 2:
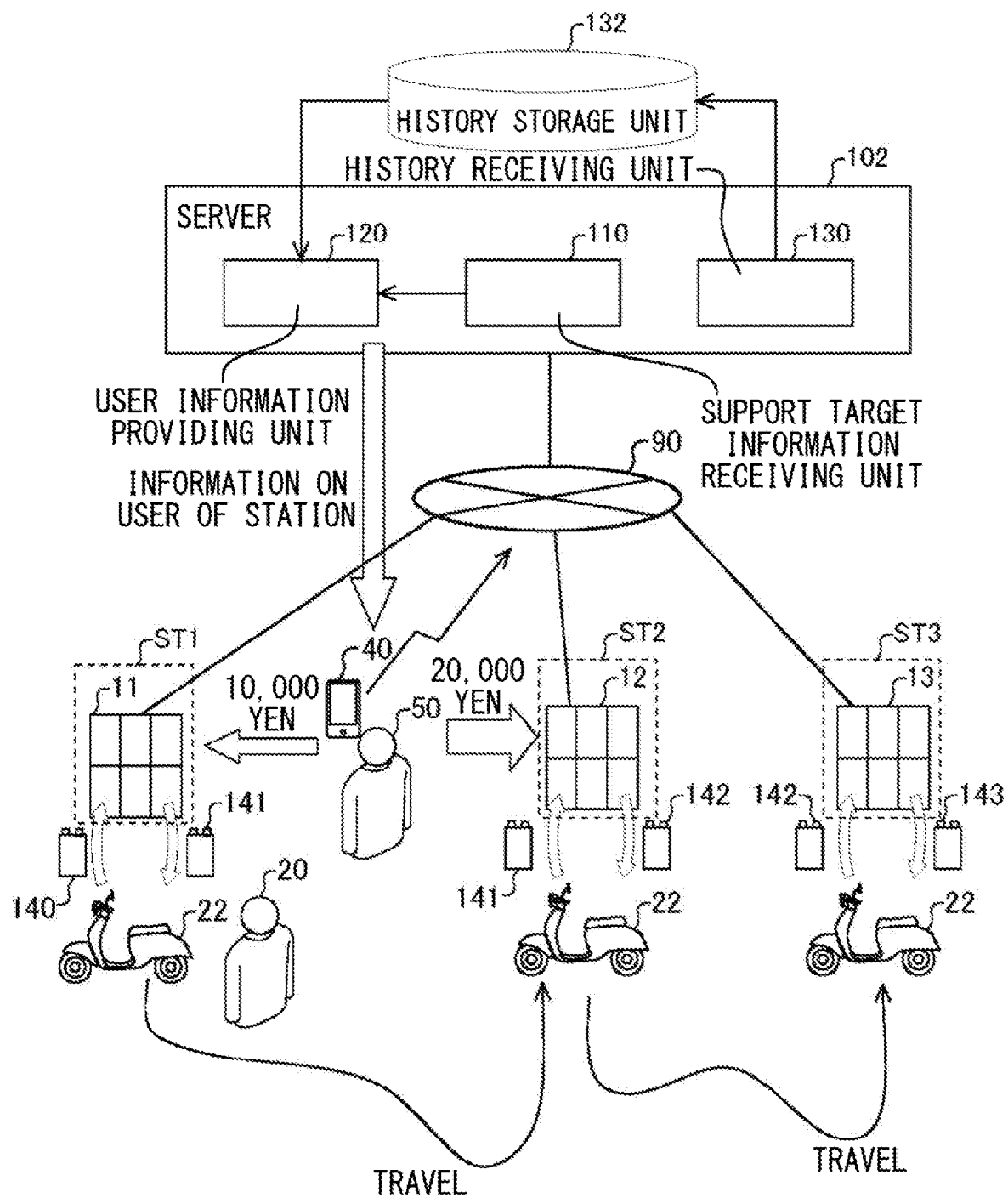
FIG. 2 schematically shows a more detailed configuration of the operation system 100.

FIG. 2 schematically shows a more detailed configuration of the operation system 100. The operation system 100 includes the system 102, the communication network 90, the battery exchanger 11, the battery exchanger 12, a battery exchanger 13, the battery 140, the battery 141, the battery 142, a battery 143, and an electric motorcycle 22.

The battery exchanger 11, the battery exchanger 12, and the battery exchanger 13 can accept any of the battery 140, the battery 141, the battery 142, and the battery 143. The battery 140, the battery 141, the battery 142 and the battery 143 can all be mounted on the electric motorcycle 22. Note that in a case of collectively describing the battery 140, the battery 141, the battery 142, and the battery 143, for example, they may be collectively referred to as "battery". In a case of collectively describing the battery exchanger 11, the battery exchanger 12, and the battery exchanger 13, for example, they may be collectively referred to as "battery exchanger".

The battery exchanger 11 forms at least a part of a battery station ST1 for providing the electric motorcycle 22 with a replacement battery. The battery exchanger 12 forms at least a part of a battery station ST2 for providing the electric motorcycle 22 with a replacement battery. The battery exchanger 13 forms at least a part of a battery station ST3 for providing the electric motorcycle 22 with a replacement battery. Each of the battery exchanger 11, the battery exchanger 12, and the battery exchanger 13 charges the accepted battery with power supplied from a power source such as a power supply system or a generator. The generator may include a natural energy generator. The battery exchanger 11 communicates with the system 102 through the communication network 90.

The electric motorcycle 22 is an example of a device that operates with the power of a battery 140a and a battery 140b. The battery 140 mounted on the electric motorcycle 22 supplies power to the electric motorcycle 22. The electric motorcycle 22 travels by converting the electrical energy supplied from the battery 140 into motive power. The electric motorcycle 22 may use the electrical energy supplied from the battery 140 to drive the electric devices provided in the electric motorcycle. The electric motorcycle 22 is one example of a vehicle. The vehicle may be an electric bicycle, a motorcycle, or a four-wheeled motor vehicle. A vehicle is one example of a transport device. A transport device is one example of a movable body.

One example of a scene where the user 20 uses the operation system 100 will be specifically described with reference to FIG. 2. The user 20 removes the battery 140 from the electric motorcycle 22 and mounts the battery 140 on the battery exchanger 11. The battery exchanger 11 charges the mounted battery 140. The user 20 removes the battery 141 charged by the battery exchanger 11 from the battery exchanger 11, and mounts the battery 141 on the electric motorcycle 22.

The electric motorcycle 22 converts the electrical energy supplied from the battery 141 into motive power and causes the electric motorcycle 22 to travel. The user 20 removes the battery 141 from the electric motorcycle 22 at the battery station ST2, and mounts the battery 141 on the battery exchanger 12. The battery exchanger 12 charges the mounted battery 141. The user 20 removes the battery 142 charged by the battery exchanger 12 from the battery exchanger 12, and mounts the battery 142 on the electric motorcycle 22.

The electric motorcycle 22 converts the electrical energy supplied from the battery 142 into motive power and causes the electric motorcycle 22 to travel. The user 20 removes the battery 142 from the electric motorcycle 22 at the battery station ST3, and mounts the battery 142 on the battery exchanger 13. The battery exchanger 13 charges the mounted battery 142. The user 20 removes the battery 143 charged by the battery exchanger 13 from the battery exchanger 13, and mounts the battery 143 to the electric motorcycle 22. The user 20 maintains the electric motorcycle 22 in a drivable state by repeating such battery replacement.

When the user 20 replaces the battery, each of the battery exchanger 11, the battery exchanger 12, and the battery exchanger 13 transmits, to the system 102, usage history information including identification information of the battery exchanger, identification information of the user 20, identification information of a battery accepted by the battery exchanger, identification information of a battery provided by the battery exchanger to the user 20, time, and past position information of a battery accepted by the battery exchanger. Identification information of a battery and past position information of a battery are stored in a storage device provided in each battery. Each battery has a function of acquiring their position information. For example, each battery has a function of receiving a GPS signal to acquire the position of the battery.

A history receiving unit 130 receives usage history information from the battery exchanger 11, the battery exchanger 12, and the battery exchanger 13. The history storage unit 132 stores the usage history information received by the history receiving unit 130.

In the embodiment, the supporter 50 accesses the system 102 through the communication network 90 using the supporter terminal 40. The supporter terminal 40 is a communication terminal used by the supporter 50. Details of the supporter terminal 40 are not particularly limited. Examples of the supporter terminal 40 include a personal computer and a portable terminal. Examples of the portable terminal include a mobile telephone, a smart phone, a PDA, a tablet, a notebook computer or a laptop computer, and a wearable computer.

The communication network 90 may include a transmission path of wired communication, or may include a transmission path of wireless communication. The communication network 90 may include a wireless packet communication network, the Internet, a P2P network, a dedicated line, a VPN, a power line communication line, and the like. The communication network 90 (i) may include a mobile communication network such as a mobile telephone network, and (ii) may include a wireless communication network such as a wireless MAN (e.g., WiMAX (registered trademark)), a wireless LAN (e.g., WiFi (registered trademark)), Bluetooth (registered trademark), Zigbee (registered trademark), and near field communication (NFC).

The operation of the system 102 will now be described. The support target information receiving unit 110 receives, from the supporter 50, an instruction for selecting the battery exchanger for which the supporter 50 supports operation from among the battery exchanger 11, the battery exchanger 12, and the battery exchanger 13. For example, the support target information receiving unit 110 receives an instruction for selecting the battery exchanger for which the supporter 50 supports operation from the supporter terminal 40 through the communication network 90. The battery exchanger selected by the supporter 50 to support operation is sometimes abbreviated as "a battery exchanger to be supported".

The user information providing unit 120 provides the supporter 50 with information on the user of the battery exchanger to be supported, according to support value information indicating the value of the support for the operation of the battery exchanger by the supporter 50. For example, the user information providing unit 120 transmits, to the supporter terminal 40, information on the user of the battery exchanger to be supported through the communication network 90. For example, the user information providing unit 120 provides the supporter 50 with more detailed information on the user of the battery exchanger to be supported for a higher value indicated by the support value information.

The support value may be determined on the basis of the amount of support fund paid by the supporter 50 to support operation of the battery exchanger. The user information providing unit 120 may provide the supporter 50 with more detailed information on the user of the battery exchanger to be supported for a higher amount of support paid by the supporter 50.

User information may include information indicating at least one of the age and the gender of the user of the battery exchanger to be supported. User information may include information indicating a time slot in which the battery exchanger to be supported was used.

User information may include travel history of the user of the battery exchanger to be supported. For example, user information may include travel information of a user's electric motorcycle 22 mounted with a battery accepted from the user by the battery exchanger to be supported. The travel information of the electric motorcycle 22 may be information based on the history of position information stored in the battery.

As one example, a case where the battery exchanger to be supported is the battery exchanger 12 will be described. In this case, the "battery accepted from the user" is the battery 141. In other words, the travel information of the user of the battery exchanger 12 may be information based on the history of position information of the battery 141. Specifically, the travel information of the electric motorcycle 22 from when the user 20 replaces the battery by the battery exchanger 11 to when he/she replaces the battery by the battery exchanger 12 may be used. The travel information of the electric motorcycle 22 may be information indicating a travel distance. The travel information of the electric motorcycle 22 may be information indicating a travel range of the electric motorcycle 22. The travel range may be the distance between the position of the battery exchanger 12 and a position farthest from the battery exchanger 12 among positions indicated by the position information of the electric motorcycle 22.

By providing the supporter 50 with such travel information, the supporter 50 can adapt the assortment of goods of his/her store to the user of the battery exchanger 12. For example, if there are many users traveling from a distance, it may be desirable to stock a wide variety of food that can be eaten on the spot.

User information may include travel information of a user's electric motorcycle 22 mounted with a battery provided to the user by the battery exchanger to be supported. As one example, a case where the battery exchanger to be supported is the battery exchanger 12 will be described. In this case, the "battery provided to the user" is the battery 142. In other words, the travel information of the user of the battery exchanger 12 may be information based on the history of position information of the battery 142. That is, the travel information of the user of the battery exchanger 12 may be travel information of the user after the user replaces the battery by the battery exchanger 12. The travel information of the electric motorcycle 22 may be information indicating a travel distance. The travel information of the electric motorcycle 22 may be information indicating a travel range of the electric motorcycle 22. The travel range may be the distance between the position of the battery exchanger 12 and a position farthest from the battery exchanger 12 among positions indicated by the position information of the electric motorcycle 22.

For example, when the battery exchanger 13 accepts the battery 142 from the user 20, the battery exchanger 13 transmits the history of position information of the battery 142 stored in the battery 142 to the system 102. The system 102 can acquire the travel history of the user of the battery exchanger 12 on the basis of the history of position information.

By providing the supporter 50 with such travel information, the supporter 50 can adapt the assortment of goods of his/her store to the user of the battery exchanger 12. For example, if there are many users traveling to distant location, it may be desirable to stock a wide variety of food that can be carried.

In the system 102, the history receiving unit 130 receives, from each of the battery exchangers, the history of position information of a battery stored in the storage device in the battery received by each battery exchanger. The user information providing unit 120 provides, as travel information, information based on the history of position information acquired by the history receiving unit 130 to the supporter 50.

Specifically, the history storage unit 132 stores, in association with one another, identification information of a user of a battery exchanger, identification information of the battery exchanger, identification information of a battery accepted by the battery exchanger, identification information of a battery provided by the battery exchanger, a time when the battery exchanger was used, and a history of position information of the first battery stored in a storage device in the battery accepted by the battery exchanger. Thus, the user information providing unit 120 can provide, as travel information, information based on the history of position information stored in the history storage unit 132 to the supporter 50.

When the supporter 50 determines the battery exchanger to be supported, the user information providing unit 120 provides the supporter 50 with first information on the user of the battery exchanger. Then, after the supporter 50 determines the battery exchanger to be supported, the supporter 50 is provided with second information on the user of the battery exchanger to be supported, according to the amount of support fund actually paid by the supporter 50. Here, the second information is more detailed information than the first information. Providing the first information to the supporter 50 may enhance the motivation for the supporter 50 to support the battery exchanger.

The parts of the system 102 may be implemented by hardware, software, or both hardware and software. In a case where at least some of the components forming the system 102 are implemented by software, the component implemented by software may be implemented by activating software or a program that defines an operation related to the component in an information processing device having a general configuration. The above information processing device may include (i) a data processing device having a processor such as a CPU or GPU, a ROM, a RAM, a communication interface, and the like, (ii) a keyboard, a touch panel, a camera, a microphone, various sensors, and an input device such as a GPS receiver, (iii) an output device such as a display device, a speaker, and a vibration device, and (iv) a storage device such as a memory and an HDD (including an external storage device). In the above information processing device, the above data processing device or storage device may store the above software or program. The above software or program is executed by the processor to cause the above information processing device to execute an operation defined by the software or program. The above software or program may be stored in a non-transitory computer readable recording medium.

The above software or program may be a control program for controlling the system 102. The control program described above may cause a computer to execute a support target information receiving step of receiving, from the supporter 50 who supports operation of a battery exchanger, an instruction for selecting the battery exchanger for which the supporter supports operation from among multiple battery exchangers, and a user information providing step of providing the supporter with information on a user of the battery exchanger selected by the supporter, according to support value information indicating a value of the support for the operation of the battery exchanger by the supporter, for example. The computer described above may function as the system 102. The computer described above may be a processing device, such as a processor, that performs the functions of the system 102.

Figure 3:
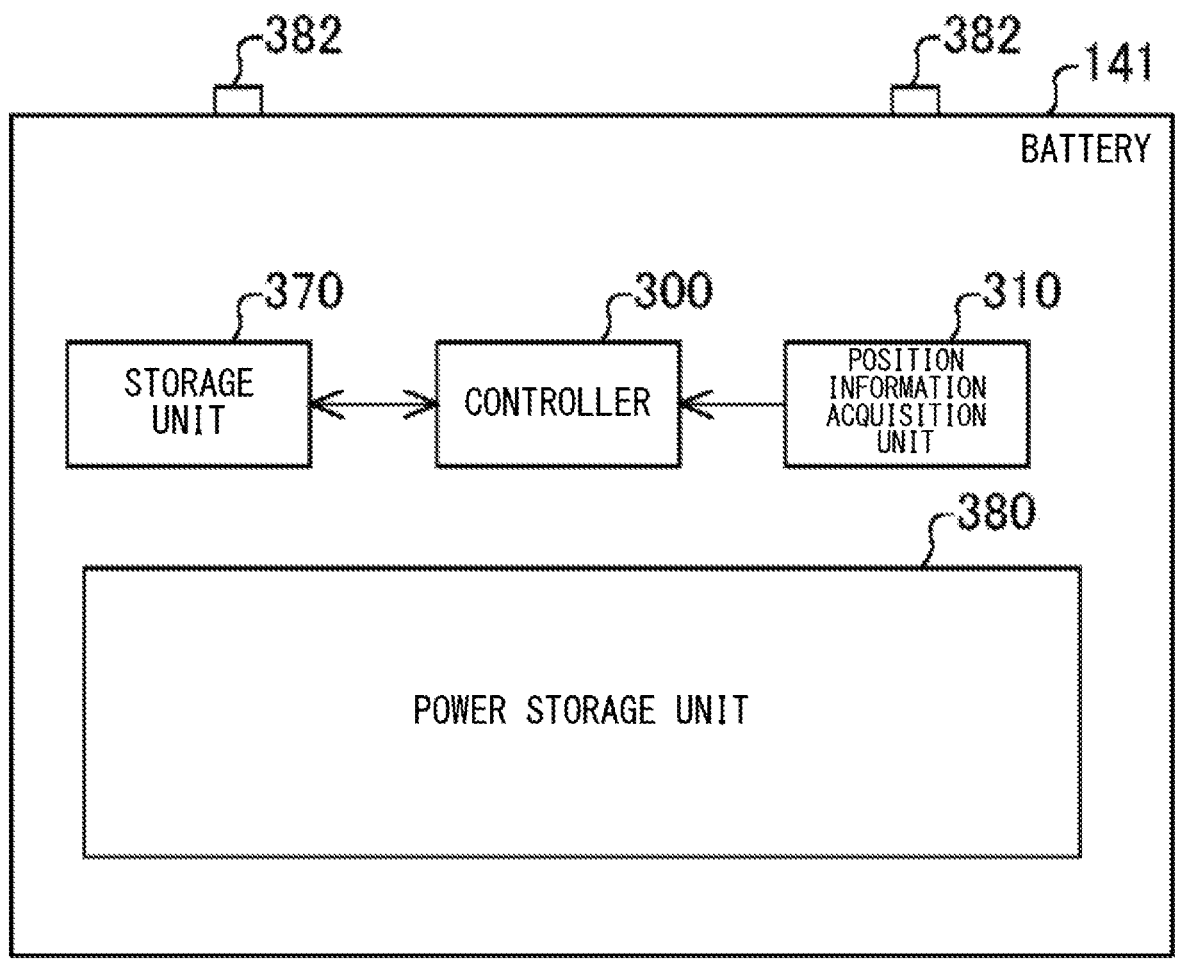
FIG. 3 schematically shows an internal configuration of a battery 141.

FIG. 3 schematically shows an internal configuration of the battery 141. The battery 141 includes a controller 300, a position information acquisition unit 310, a storage unit 370, a power storage unit 380, and a terminal 382.

The storage unit 370 stores information used for an operation of the controller 300. The storage unit 370 may include a non-transitory storage medium. The storage unit 370 may store identification information assigned to the battery 141.

The position information acquisition unit 310 acquires position information of the battery 141. The position information acquisition unit 310 may receive radio waves from GPS satellites and output position information to the controller 300, for example.

The controller 300 controls each part of the battery 141. The controller 300 may control each part of the battery 141 on the basis of the information stored in the storage unit 370. The controller 300 may control the storage unit 370 to store the history of position information acquired from the position information acquisition unit 310. For example, the controller 300 may store the history of position information acquired from the position information acquisition unit 310 in the storage unit 370 in association with the time when the position is acquired.

When the battery 141 is mounted on the battery exchanger 11, the battery exchanger 12, or the battery exchanger 13, the controller 300 communicates with the mounted battery exchanger to transmit the information stored in the storage unit 370. For example, the controller 300 transmits the history of position information of the battery 141 stored in the storage unit 370 and the identification information of the battery 141 to the battery exchanger 11, the battery exchanger 12, and the battery exchanger 13. Communication between the controller 300 and the battery exchanger may be achieved by power line communication through the terminal 382.

The power storage unit 380 stores electrical energy supplied from a battery exchanger or the like through the terminal 382. When the battery 141 is mounted on the electric motorcycle 22, the electrical energy stored in the power storage unit 380 can be supplied to the electric motorcycle 22 through the terminal 382.

One example of an internal configuration of the battery 141 has been described with reference to FIG. 3. The battery 140, the battery 142 and the battery 143 have similar internal configurations as the battery 141. Hence, the description of the internal configuration of the battery 140, the battery 142, and the battery 143 will be omitted.

FIG. 4 illustrates one example of information stored in the history storage unit 132 in a table format. The history storage unit 132 stores, in association with one another, a user ID, a battery exchanger ID, an accepted battery ID and provided battery ID, time information, and position history information. The history receiving unit 130 may receive the user ID, the battery exchanger ID, the accepted battery ID, the provided battery ID, the time information, and the position history information from the battery exchanger 11, the battery exchanger 12, and the battery exchanger 13.

The information stored in the history storage unit 132 will be described by taking up information received from the battery exchanger 12.

The user ID is one example of identification information of the user 20. The user ID may be acquired when the user 20 uses the battery exchanger 12, for example. For example, the user ID may be stored in a user card of the operation system 100 issued to the user 20. The user 20 brings the user card close to a card reader of the battery exchanger 12 before using the battery exchanger 12. The battery exchanger 12 may acquire the user ID of the user 20 by reading the user ID from the presented user card.

The battery exchanger ID is one example of identification information of the battery exchanger 12. The battery exchanger ID is stored in advance in the battery exchanger 12 when the battery exchanger 12 is manufactured. The system 102 stores information indicating the position where the battery exchanger 12 is installed in association with the battery exchanger ID of the battery exchanger 12. With this configuration, the system 102 can identify the position of the battery exchanger 12 on the basis of the battery exchanger ID.

The accepted battery ID is identification information of the battery 141 accepted from the user 20 by the battery exchanger 12. The provided battery ID is identification information of the battery 142 provided to the user 20 by the battery exchanger 12.

The time information indicates the time when the user 20 uses the battery exchanger 12. The time information may be the time when the user 20 holds the user card over the battery exchanger 12.

The position history information indicates the history of position information of the battery 141. For example, the position information may include information indicating the position of the battery 141 at multiple past timings, and information indicating the time of the multiple timings. The position information may be information indicating the position of the battery 141 after the battery exchanger 11 provides the user 20 with the battery 141. Note that when the battery exchanger 12 accepts the battery 141, after reading out the position information stored in the storage unit 370 of the battery 141, the battery exchanger 12 may delete the position information stored in the storage unit 370 of the battery 141. The position information may include latitude information and longitude information.

By storing such information in the history receiving unit 130, the user 20's exchange history can be identified. Then, the system 102 can identify, on the basis of the information stored in the history receiving unit 130, the number of times of use of each battery exchanger, the repeat rate of repeatedly using each battery exchanger, the attribute of the user, the travel distance and travel range from the last battery replacement to the next battery replacement, and the travel distance and travel range from the battery replacement this time to the next battery replacement.

Figure 5:
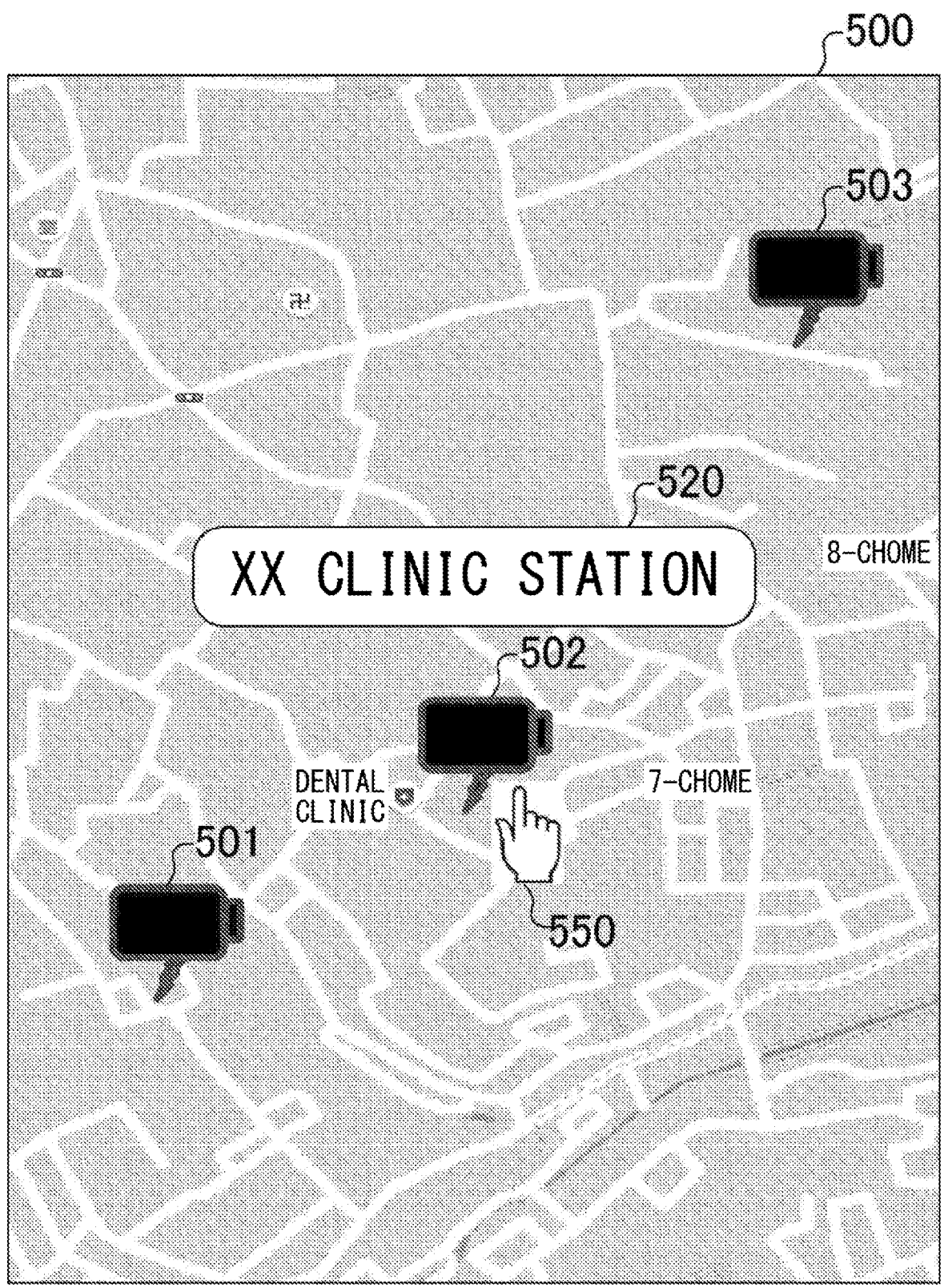
FIG. 5 shows one example of a screen 500 displayed on a supporter terminal 40.

FIG. 5 shows one example of a screen 500 displayed on the supporter terminal 40. The screen 500 is displayed on the supporter terminal 40 when the supporter terminal 40 accesses a specific URL of the operator of the system 102. The screen 500 is a screen for selecting a battery exchanger.

The screen 500 includes a map image. On the screen 500, the supporter terminal 40 displays icons 501, 502, and 503 such that they are superimposed on the map image. Positions of the icons 501, 502, and 503 indicate positions of the battery exchanger 11, the battery exchanger 12, and the battery exchanger 13 on the map image, respectively.

The supporter terminal 40 displays a pointer 550 for the supporter 50 to select a position on the map image, such that the pointer 550 is superimposed on the map image. When the supporter 50 places the pointer 550 on the icon 502, a window 520 showing the name of the battery exchanger 12 pops up. When the supporter 50 performs a selection operation such as clicking while the window 520 is displayed, the screen changes to a screen for displaying brief information on the user of the battery exchanger 12.

Figure 6:
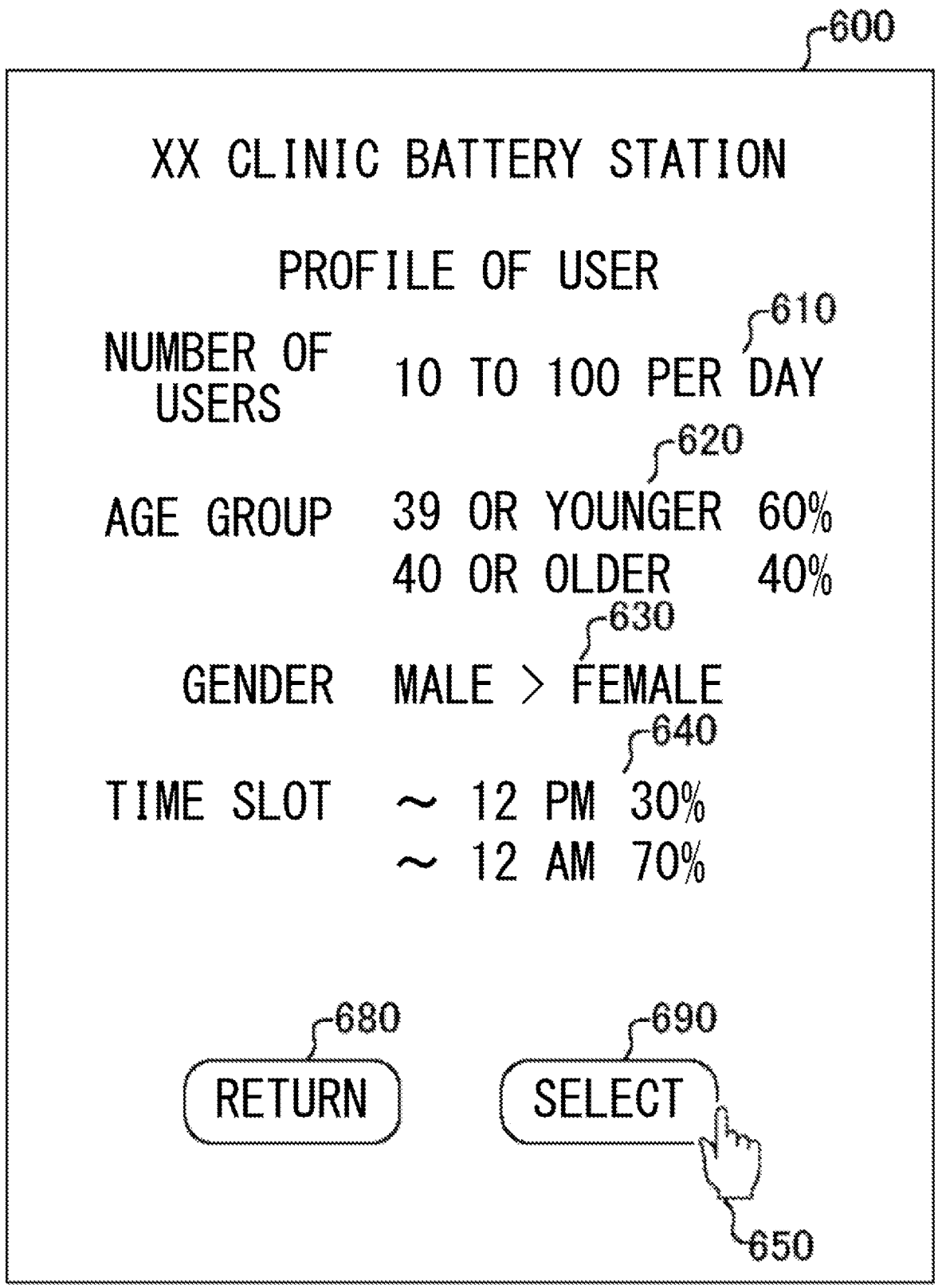
FIG. 6 shows one example of a screen 600 displayed on the supporter terminal 40.

FIG. 6 shows one example of a screen 600 displayed on the supporter terminal 40. The screen 600 is one example of a screen for displaying brief information of the user of the battery exchanger 12. The screen 600 includes an object 610 indicating the number of users, an object 620 indicating the composition ratio of the user's age group, an object 630 relating to the gender of the user, an object 640 indicating the used time slot, a button 680 for returning to the previous screen, and a button 690 for selecting the battery exchanger 12.

As shown in the object 610, on the screen 600, the number of users is displayed as a specific range. As shown in the object 620, the composition ratio of the user's age group is displayed in two age groups. As shown in the object 630, the information on the user's gender indicates the relative magnitude of the number of users. As shown in the object 640, the used time slot is displayed in two time slots.

When the supporter 50 performs a selecting operation such as clicking while the pointer 650 is placed on the button 680, the screen 500 shown in FIG. 5 is displayed. When the supporter 50 performs a selecting operation such as clicking while the pointer 650 is placed on the button 690, the screen changes to a screen for setting an amount of support fund for the battery exchanger 12.

Figure 7:
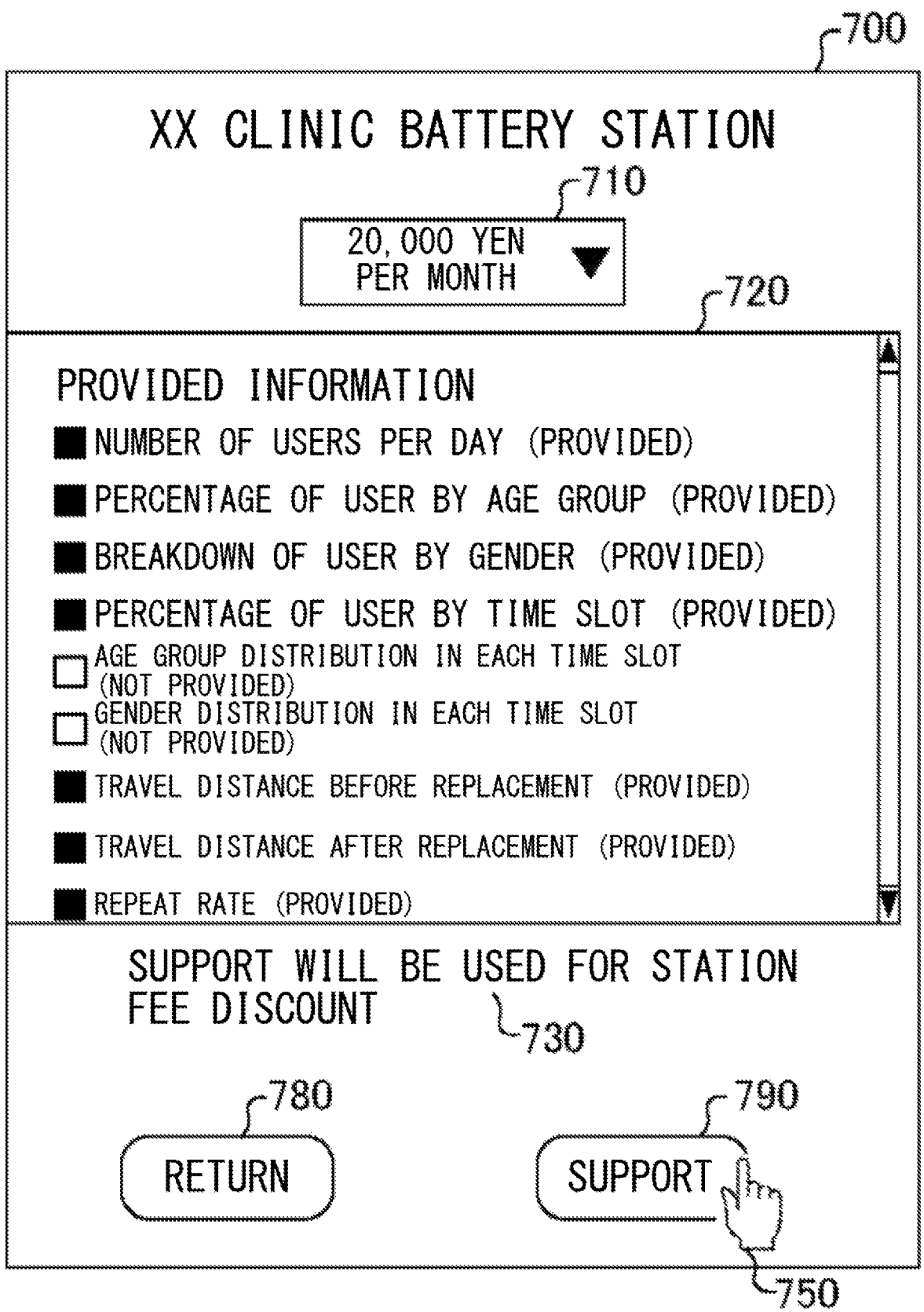
FIG. 7 shows one example of a screen 700 displayed on the supporter terminal 40.

FIG. 7 shows one example of a screen 700 displayed on the supporter terminal 40. The screen 700 is one example of a screen for setting the amount of support fund for the battery exchanger 12. The screen 700 includes an object 710 for selecting an amount of support fund, an object 720 indicating information provided to the supporter, an object 730 indicating use of a support, a button 780 for returning to the previous screen, and a button 790 for determining a support.

The object 710 is a selector object. The supporter 50 can select an amount of support fund by selecting a desired selection item of the selector.

The object 720 includes information provided when the amount of support fund selected in the object 710 is paid. The object 720 includes information that is not provided with the amount of support fund selected in the object 710. Whether or not each piece of information is provided is identifiably presented to the supporter 50 by a mark or characters. In the object 720, black square marks indicate information to be provided. In the object 720, open square marks indicate information that is not provided.

The object 730 indicates what the support money is used for. The object 730 allows the supporter 50 to easily understand that the support money leads to promotion of use of the battery exchanger 12.

When the supporter 50 performs a selecting operation such as clicking while the pointer 750 is placed on the button 780, the screen 600 shown in FIG. 6 is displayed. When the supporter 50 performs a selecting operation such as clicking while the pointer 750 is placed on the button 790, the information to the effect of selecting the battery exchanger 12 and the amount of support fund are determined and sent to the system 102 together with the identification information of the supporter 50. In the system 102, the identification information of the supporter 50, the amount of support fund, and the identification information of the selected battery exchanger 12 are stored in association with one another.

Figure 8:
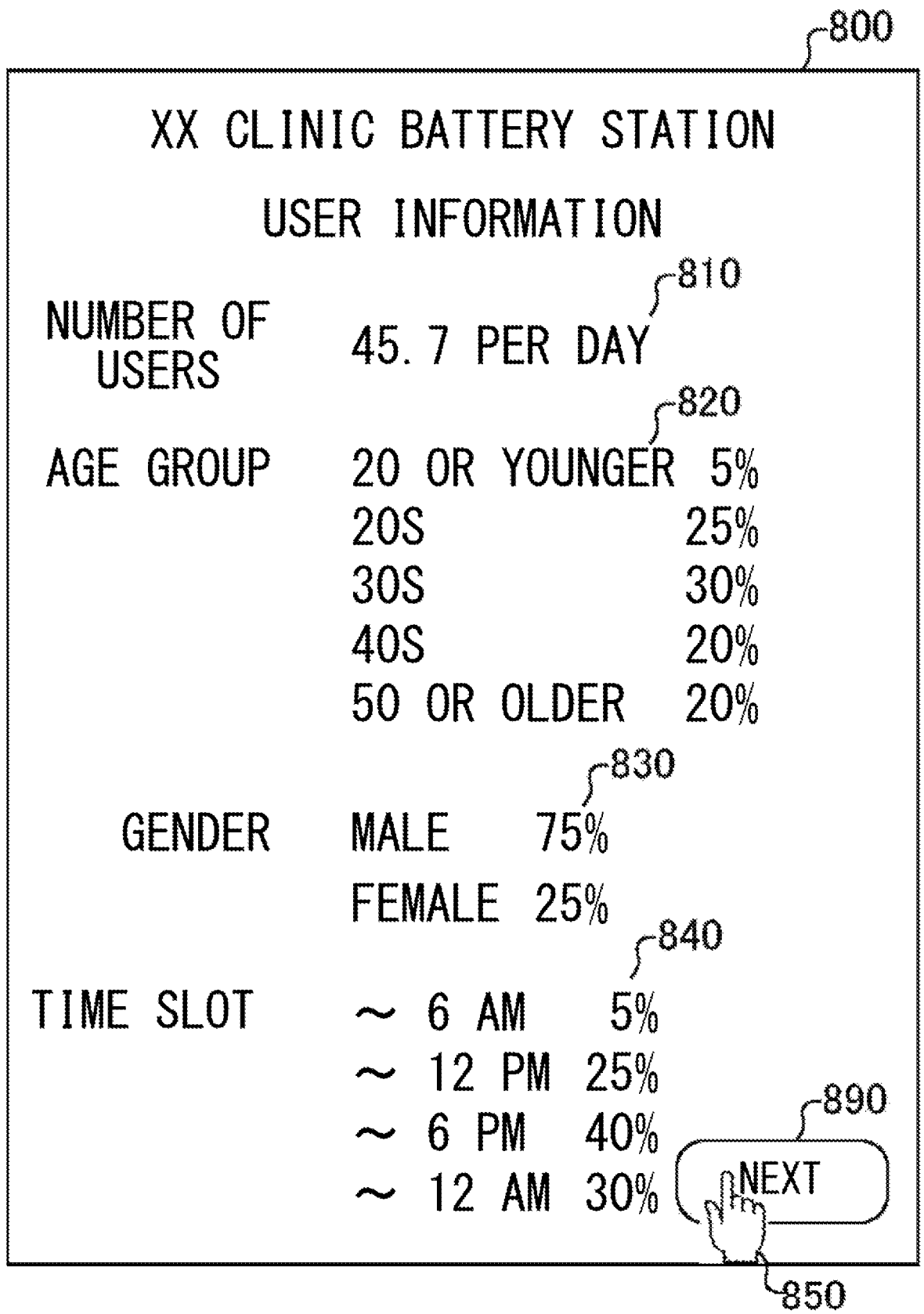
FIG. 8 shows one example of a screen 800 displayed on the supporter terminal 40.

FIG. 8 shows one example of a screen 800 displayed on the supporter terminal 40. The screen 800 is one example of a screen for presenting the information on the user of the battery exchanger 12 to the supporter 50. The screen 800 includes an object 810 indicating the number of users, an object 820 indicating the composition ratio of the user's age group, an object 830 relating to the composition ratio of the user's gender, an object 840 indicating the used time slot, and a button 890 for displaying the following information.

As shown in the object 810, on the screen 800, the number of users is displayed as an average value of the number of users per day. As shown in the object 820, the composition ratio of the user's age group is displayed in five age groups. As shown in the object 830, the composition ratio of the gender of the user is displayed. As shown in the object 840, the used time slot is displayed by being subdivided into four time slots.

As shown in the screen 800, when the support is paid, more detailed information is displayed as compared to the brief information provided by the screen 600 of FIG. 6. For example, the object 810 displays the average number of users to one decimal place. As shown in the object 820 and the object 840, the age group and the time slot are displayed more specifically. As shown in the object 830, the composition ratio of the gender of the user is displayed numerically.

When the supporter 50 performs a selecting operation such as clicking while the pointer 850 is placed on the button 890, the screen changes to a screen for displaying the next additional information. Note that the button 890 is not displayed if the amount of support fund is 10,000 yen or less per month, for example. The button 890 is displayed when the amount of support fund is 20,000 yen or more per month. If the amount of support fund is 10,000 yen or less per month, only the information of the items shown in FIG. 8 is presented to the supporter 50.

FIG. 9 shows one example of a screen 900 displayed on the supporter terminal 40. The screen 900 is an example of a screen displayed when the selecting operation is performed on the button 890 of the screen 800. The screen 900 includes an object 910 showing the average travel distance from the previous battery replacement, an object 920 showing the average travel distance to the next battery replacement after battery replacement, and an object 930 showing the repeat rate using the battery exchanger 12.

If the amount of support fund is 20,000 yen or more per month, in addition to the information provided by the screen 800, the information provided by the screen 900 can be provided to the supporter 50. As described above, according to the operation system 100, it is possible to provide more information about the user of the battery exchanger 12 to the supporter 50 who provides support of a higher value.

The application range of the battery exchanger in the operation system 100 described above is not limited to the battery exchanger for the battery 140 of the electric motorcycle 22. The operation system 100 is applicable to battery exchangers in various other devices. Additionally, the support target is not limited to operation of the battery exchanger. Operation of various devices and systems can be targeted for support.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

11 Battery exchanger
12 Battery exchanger
13 Battery exchanger
20 User
22 Electric motorcycle
40 Supporter terminal
50 Supporter
90 Communication network
102 System
110 Support target information receiving unit
120 User Information providing unit
130 History receiving unit
132 History storage unit
140 Battery
300 Controller
310 Position information acquisition unit
370 Storage unit
380 Power storage unit
100 Operation system
141 Battery
142 Battery
143 Battery
382 Terminal
500 Screen
501 Icon
502 Icon
503 Icon
520 Window
550 Pointer
600 Screen
610 Object
620 Object
630 Object
640 Object
650 Pointer
680 Button
690 Button
700 Screen
710 Object
720 Object
730 Object
750 Pointer
780 Button
790 Button
800 Screen
810 Object
820 Object
830 Object
840 Object
850 Pointer
890 Button
900 Screen
910 Object
920 Object
930 Object

What is claimed is:

1. A system for one or more battery exchangers that each accept a used first battery and identification information of a user of a battery exchanger, provide a charged second battery to the user, and generate a portion of usage history information associating the identification information of the user with at least one of identification information of the battery exchanger, identification information of the used first battery, and identification information of the charged second battery, the system comprising:
   a history receiving unit that receives, from each of the one or more battery exchangers, the usage history information;
   a support target information receiving unit that receives, from a device of a supporter, an instruction for selecting the battery exchanger for which a support fund supports operation from among the one or more battery exchangers and support value information indicating a value of the support fund for the operation of the battery exchanger; and
   a user information providing unit that provides the device of the supporter with information on the user of the battery exchanger selected by the supporter, according to the value of the support fund, the information based on the usage history information.

2. The system according to claim 1, wherein
   the user information providing unit provides the supporter with more detailed information on the user of the battery exchanger selected by the supporter for a higher value indicated by the support value information.

3. The system according to claim 1, wherein
   the information on the user includes information indicating at least one of an age and a gender of the user of the battery exchanger selected by the supporter.

4. The system according to claim 1, wherein
   the information on the user includes information indicating a time slot in which the battery exchanger selected by the supporter is used.

5. The system according to claim 1, wherein
   the information on the user includes travel information of a movable body of the user mounted with the first battery accepted from the user by the battery exchanger selected by the supporter.

6. The system according to claim 1, wherein
the information on the user includes travel information on a movable body of the user mounted with the second battery provided to the user by the battery exchanger selected by the supporter.

7. The system according to claim 5, wherein
the history receiving unit receives, as part of the usage history information from each of the one or more battery exchangers, a history of position information of a battery accepted by each battery exchanger, the history stored in a storage device in the battery, and
the user information providing unit provides the supporter with information based on the history of position information as the travel information.

8. The system according to claim 7, further comprising
a history storage unit that stores, in association with one another, identification information of a user of a battery exchanger, identification information of the battery exchanger, identification information of the first battery accepted by the battery exchanger, identification information of the second battery provided by the battery exchanger, a time when the battery exchanger is used, and a history of position information of the first battery stored in the storage device in the first battery, wherein
the user information providing unit provides the supporter with information based on the history of position information stored in the history storage unit as the travel information.

9. The system according to claim 1, wherein
the value is based on an amount of the support fund paid by the supporter to support operation of the battery exchanger, and
the user information providing unit
provides the supporter with first information on a user of a battery exchanger selected by the supporter when the supporter determines the battery exchanger to be supported by the supporter, and
provides the supporter with second information according to the amount of the support fund actually paid by the supporter after the supporter determines the battery exchanger to be supported by the supporter, the second information being more detailed information, than the first information, on the user of the battery exchanger selected by the supporter.

10. The system according to claim 1, further comprising the one or more battery exchangers.

11. A non-transitory computer readable storage medium storing a program for controlling a system for one or more battery exchangers that each accept a used first battery and identification information of a user of a battery exchanger, provide a charged second battery to the user, and generate a portion of usage history information associating the identification information of the user with at least one of identification information of the battery exchanger, identification information of the used first battery, and identification information of the charged second battery, the program causing a computer to execute:
receiving, from each of the one or more battery exchangers, the usage history information;
receiving, from a device of a supporter, an instruction for selecting the battery exchanger for which a support fund supports operation from among the one or more battery exchangers and support value information indicating a value of the support fund for the operation of the battery exchanger; and
providing the device of the supporter with information on the user of the battery exchanger selected by the supporter, according to the value of the support fund, the information based on the usage history information.

* * * * *